(12) United States Patent
Lin et al.

(10) Patent No.: US 11,844,301 B1
(45) Date of Patent: Dec. 19, 2023

(54) GRASS TRIMMER WITH ANTI-STICKING MECHANISM AND METHOD FOR USING THE SAME

(71) Applicant: Yongkang Xinsen Industry and Trade Co., Ltd., Jinhua (CN)

(72) Inventors: Zhifu Lin, Jinhua (CN); Rongyan Luo, Jinhua (CN); Yuzhu Zeng, Jinhua (CN)

( * ) Notice: Subject to any disclaimer, the term of this patent is extended or adjusted under 35 U.S.C. 154(b) by 0 days.

(21) Appl. No.: 18/133,476

(22) Filed: Apr. 11, 2023

(30) Foreign Application Priority Data

Feb. 27, 2023 (CN) .......................... 202310170002.4

(51) Int. Cl.
- *A01D 34/90* (2006.01)
- *A01D 34/78* (2006.01)
- *A01D 34/82* (2006.01)
- *A01D 101/00* (2006.01)

(52) U.S. Cl.
CPC ............. *A01D 34/90* (2013.01); *A01D 34/78* (2013.01); *A01D 34/824* (2013.01); *A01D 2101/00* (2013.01)

(58) Field of Classification Search
CPC ...... A01D 34/90; A01D 34/78; A01D 34/824; A01D 2101/00
See application file for complete search history.

(56) References Cited

U.S. PATENT DOCUMENTS

| | | | |
|---|---|---|---|
| 4,249,310 A * | 2/1981 | Secoura | A01D 34/73 30/276 |
| 4,249,311 A * | 2/1981 | Inaga | A01D 34/4161 30/276 |
| 4,265,018 A * | 5/1981 | Schrock | A01D 34/73 30/276 |
| 4,265,019 A * | 5/1981 | Kilmer | A01D 34/4161 30/276 |
| 8,695,223 B2 * | 4/2014 | Ito | A01D 34/90 30/277.4 |
| 8,869,369 B1 * | 10/2014 | Roach | A01D 34/733 83/698.41 |
| 2007/0214655 A1 * | 9/2007 | Arnetoli | A01D 34/4166 30/276 |
| 2009/0321063 A1 * | 12/2009 | Bryant, Jr. | E21B 29/005 166/55.7 |
| 2011/0131816 A1 * | 6/2011 | Ito | A01D 34/90 30/276 |
| 2012/0048582 A1 * | 3/2012 | Yamada | A01D 34/905 30/276 |

(Continued)

*Primary Examiner* — Sean M Michalski
(74) *Attorney, Agent, or Firm* — Che-Yang Chen; Law Office of Michael Chen

(57) ABSTRACT

A grass trimmer with an anti-sticking mechanism may include a first handle, a mounting rod, and a second handle. The first handle is arranged on top of the mounting rod. The second handle is arranged on the mounting rod close to the first handle. A battery pack is arranged at a bottom end of the first handle. A machine head housing is arranged at a bottom end of the mounting rod. A first motor is arranged inside the machine head housing. A mounting shaft is on an output shaft of the first motor via a coupling. A cutting wheel is arranged at a bottom of the mounting shaft. In the present invention, outer ends of blades cut off grass wound on the mounting shaft during up-down movement of the blades, so that the mounting shaft is prevented from being stuck by the grass to improve mowing efficiency

9 Claims, 9 Drawing Sheets

(56) References Cited

U.S. PATENT DOCUMENTS

| | | | |
|---|---|---|---|
| 2012/0204428 A1* | 8/2012 | Yang | A01D 34/905 30/276 |
| 2013/0199855 A1* | 8/2013 | Shears | E21B 10/32 175/263 |
| 2016/0249527 A1* | 9/2016 | Itoh | A01D 34/6812 30/206 |
| 2017/0231153 A1* | 8/2017 | Hoffman | A01D 34/4161 30/276 |
| 2018/0020615 A1* | 1/2018 | Alliss | A01D 34/4163 30/276 |
| 2023/0059955 A1 | 2/2023 | Mayerle | |

* cited by examiner

GRASS TRIMMER WITH ANTI-STICKING MECHANISM AND METHOD FOR USING THE SAME

FIELD OF THE INVENTION

The present invention relates to the technical field of grass trimmers, in particular to a grass trimmer with an anti-sticking mechanism and a use method thereof.

BACKGROUND OF THE INVENTION

Grass trimmers include all hand-held tools for cutting weeds in lawns, gardens, pastures, etc. Grass trimmers may be classified into oil-driven ones and electric-driven ones according to power sources and may be classified into front power type ones and rear power type ones according to power head structures. A current grass trimmer usually includes a machine housing, a grass trimming head, and a gear motor arranged in the machine housing, where a lower end of an output shaft of the gear motor extends down to a lower part of the machine housing, and the grass trimming head is fixed to the lower end of the output shaft. Because there is a gap between the machine housing and a housing of the grass trimming head, during operation of the grass trimmer, some weeds will be wound on the output shaft between the machine housing and the housing of the grass trimming head, so that a load and rotational speed of the grass trimming head are increased and reduced, and even the output shaft is stuck and stops rotating.

The Chinese patent No. CN111972115B discloses an anti-winding and sticking device for a grass trimmer, including: a blade accommodation groove arranged on a top surface of a housing of a grass trimming head; a cutting edge accommodation groove arranged on an outer side surface of an output shaft; a cutting blade having a first end that is rotatably arranged on an inner wall of the blade accommodation groove via a shaft rod; and a pre-tightening spring that provides an elastic force for driving the cutting blade to rotate around the shaft rod upwards, to make a cutting edge of the cutting blade enter the cutting edge accommodation groove. During operation of the grass trimmer, when a rotational speed of the grass trimming head is higher than a set rotational speed n1, the cutting blade rotates around the shaft rod downwards under the action of a centrifugal force; and when the rotational speed of the grass trimming head is lower than a set rotational speed n2, the cutting blade rotates around the shaft rod upwards under the action of the pre-tightening spring.

However, there are still disadvantages in the above solution: only when a rotational speed of a mounting shaft is reduced to be lower than the set rotational speed n2 after the mounting shaft is wound with grass, the grass wound starts to be cut off, that is, the grass wound on the mounting shaft is intermittently cut off, so that the mounting shaft cannot rotate stably at a constant speed, and the cutting efficiency of the grass is reduced.

SUMMARY OF THE INVENTION

An objective of the present invention is to provide a grass trimmer with an anti-sticking mechanism for overcoming the above problems or at least partially solving the above problems, and a use method thereof, to solve the problems that the grass wound on the mounting shaft is intermittently cut off, so that the mounting shaft cannot rotate stably at a constant speed, and the cutting efficiency of the grass is reduced.

To achieve the above objective, the technical solution of the present invention is specifically implemented as follows:

The present invention provides a grass trimmer with an anti-sticking mechanism, including a first handle, a mounting rod, and a second handle, where the first handle is arranged at a top end of the mounting rod, the second handle is arranged at a position of the mounting rod that is close to the first handle, a battery pack is arranged at a bottom end of the first handle, a machine head housing is arranged at a bottom end of the mounting rod, a first motor is arranged inside the machine head housing, a mounting shaft is arranged on an output shaft of the first motor via a coupling, a cutting wheel is arranged at a bottom end of the mounting shaft, and a 90° rotating wheel is mounted between the cutting wheel and the mounting shaft; and a cavity is arranged inside the mounting shaft along a length direction of the mounting shaft, a linear moving mechanism is arranged inside the cavity, blades are arranged on two sides of the linear moving mechanism, strip-shaped through grooves are arranged on two sides of the mounting shaft, outer ends of the blades extend out of the strip-shaped through grooves, and the linear moving mechanism is capable of driving the blades to move in the strip-shaped through grooves along the length direction of the mounting shaft.

Preferably, the linear moving mechanism includes a first mounting plate, a threaded rod, a moving block, a second mounting plate, and a reversible motor, where the first mounting plate is arranged at an inner top of the cavity, the second mounting plate is located at an inner bottom of the cavity, the reversible motor is mounted on a top surface of the second mounting plate, a bottom end of the threaded rod is fixedly connected to an output shaft of the reversible motor, a top end of the threaded rod is rotatably connected to a bottom surface of the first mounting plate, the moving block is in threaded connection with the threaded rod, the moving block is movably arranged inside the cavity, and inner ends of the two blades are connected to an outer side of the moving block.

Preferably, the blades are of a rectangular structure, upper and lower ends of each of the blades are provided with cutting edges, stop blocks are arranged at a top end and a bottom end of an outer wall of the mounting shaft, a stop groove is arranged on one end of each of the two stop blocks that is close to the corresponding blade, and a cross section of the stop groove is of a V-shaped structure.

Preferably, cross sections of the cavity, the first mounting plate, the second mounting plate, and the moving block are of a square structure, a seal cover plate is fixed to a bottom surface of the second mounting plate, and the seal cover plate is fixedly connected to the bottom end of the mounting shaft by a screw.

Preferably, a first touch switch is mounted on the bottom surface of the first mounting plate, and a second touch switch is arranged on the top surface of the second mounting plate.

Preferably, when top ends of the blades extrude the stop grooves, a top surface of the moving block exactly extrudes the first touch switch, and when bottom ends of the blades extrude the stop grooves, a bottom surface of the moving block exactly extrudes the second touch switch.

Preferably, a storage battery is arranged on a top surface of the seal cover plate, and the storage battery is electrically connected to the reversible motor, the first touch switch, and the second touch switch via wires.

Preferably, a rectangular cavity is arranged inside the moving block, the inner ends of the blades extend into the rectangular cavity, a return spring is arranged between the inner ends of the blades and an inner wall of the rectangular cavity, limit clamp blocks are fixed to the inner ends of the blades, and the limit clamp blocks are configured to limit the inner ends of the blades to the inside of the rectangular cavity.

In addition, the present invention provides a use method of a grass trimmer with an anti-sticking mechanism, including the following steps:

S1: starting a first motor, so that an output shaft of the first motor drives a mounting shaft to rotate, and the mounting shaft drives a cutting wheel to rotate for mowing;

S2: starting a reversible motor, so that an output shaft of the reversible motor drives a threaded rod to rotate, where when the threaded rod rotates clockwise, the threaded rod drives a moving block to move up, and the moving block drives blades to cut off grass wound around the mounting shaft upwards; and when the threaded rod rotates counterclockwise, the threaded rod drives the moving block to move down, and the moving block drives the blades to cut off the grass wound around the mounting shaft downwards; and S3: when the moving block extrudes a second touch switch, switching the reversible motor to clockwise rotation, and when the moving block extrudes a first touch switch, switching the reversible motor to counterclockwise rotation.

The present invention provides a grass trimmer with an anti-sticking mechanism and a use method thereof, and has the following beneficial effects:

During use, when being started, a linear moving mechanism drives two blades to move in two strip-shaped through grooves along a length direction of a mounting shaft, respectively, and outer ends of the blades extend out of the strip-shaped through grooves, so that the outer ends of the blades cut off grass wound on the mounting shaft during up-down movement of the blades, thereby preventing the mounting shaft from being stuck by the grass, and improving the efficiency of mowing; and in addition, the linear moving mechanism is started when the mounting shaft exactly starts to rotate, that is, circumferential rotation of the mounting shaft and reciprocating movement of the blades along the length direction of the mounting shaft are carried out at the same time, so that the blades can cut off, when there is the grass wound around the mounting shaft, the grass as early as possible, thereby avoiding the decrease of a rotational speed of the mounting shaft, causing the mounting shaft to always rotate at a constant speed, and effectively improving the grass trimming efficiency.

During use, a reversible motor is started; when an output shaft of the reversible motor rotates clockwise, the output shaft of the reversible motor drives a threaded rod to rotate clockwise, under the action of threaded connection between the threaded rod and a moving block, the threaded rod drives the moving block to move up inside a cavity, and the moving block drives the two blades to move up at the same time, so that the two blades simultaneously cut off the grass wound around the mounting shaft upwards; and similarly, when the output shaft of the reversible motor rotates counterclockwise, the moving block moves down inside the cavity, so that the two blades can simultaneously cut off the grass wound around the mounting shaft downwards, that is, the up-down reciprocating movement of the blades may cut off the grass wound around the mounting shaft, thereby cutting off the grass wound around the mounting shaft timely and effectively, ensuring that the mounting shaft can rotate stably at a constant speed, and improving the grass trimming efficiency of a cutting wheel.

During use, when the blades move up to a topmost end, top ends of the blades extrude the interiors of V-shaped stop grooves of stop blocks, so that grass at the topmost end is completely cut off under the extrusion of the blades and the stop grooves; and when the blades move down to a bottommost end, bottom ends of the blades extrude the interiors of the V-shaped stop grooves of the stop blocks, so that grass at the bottommost end is completely cut off under the extrusion of the blades and the stop grooves. A design that upper and lower ends of each of the blades are provided with cutting edges ensures that the blades can cut off the grass wound around the mounting shaft during up-down movement, thus effectively preventing the mounting shaft from being stuck by the grass wound.

During use, when the rotational speed of the mounting shaft increases, a centrifugal force on the blades increases with the rotational speed of the mounting shaft, so that a return spring is stretched outwards by the blades, and a length of the outer ends of the blades extending out of the mounting shaft increases. When the rotational speed of the mounting shaft increases, a thickness of the grass wound around the mounting shaft also increases, and extending out the outer ends of the blades by a greater length may improve the effect of grass cutting, to adapt to the increase of the rotational speed of the mounting shaft. When the rotational speed of the mounting shaft is lower, the centrifugal force on the blades decreases, and the blades move inwards under the action of an elastic force of the return spring, so that the length of the outer ends of the blades extending out of the mounting shaft decreases, and the outer ends of the blades may be properly protected.

BRIEF DESCRIPTION OF THE DRAWINGS

To more clearly illustrate the technical solution in the embodiments of the present invention, the accompanying drawings that need to be used in the description of the embodiments will be briefly introduced below. Apparently, the accompanying drawings in the description below merely illustrate some embodiments of the present invention. Those of ordinary skill in the art may also derive other accompanying drawings from these accompanying drawings without creative efforts.

DESCRIPTION OF THE EMBODIMENTS OF THE INVENTION

Exemplary embodiments of the present disclosure will be described in more detail below with reference to the accompanying drawings. Although exemplary embodiments of the present disclosure are shown in the accompanying drawings, it should be understood that the present disclosure may be implemented in various forms and should not be limited by the embodiments described herein. On the contrary, these embodiments are provided to understand the present disclosure more thoroughly and to convey the scope of the present disclosure to those skilled in the art completely.

Figure 1:
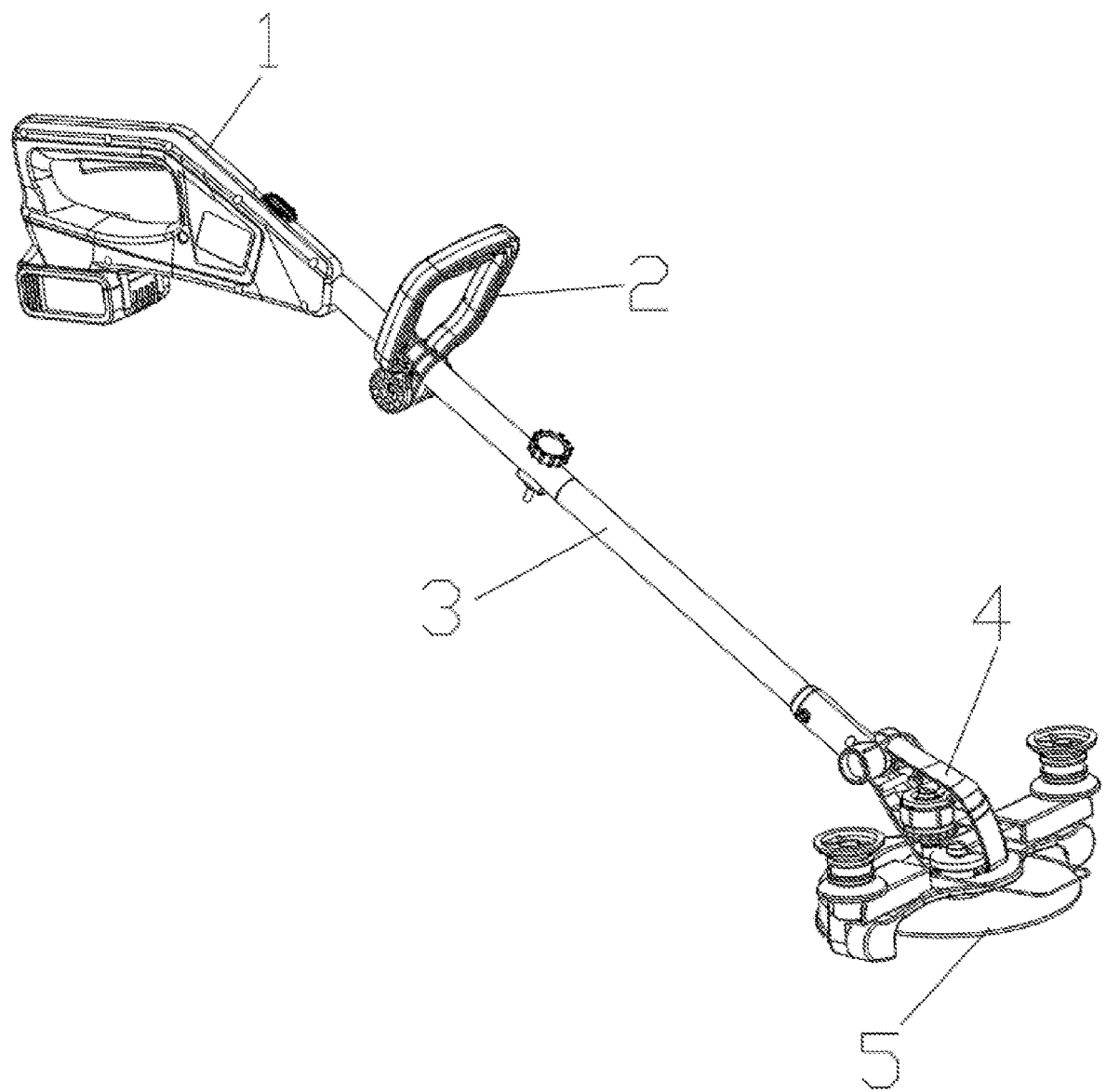
FIG. 1 is a schematic three-dimensional view of Embodiment 1 of the present invention.
Figure 2:
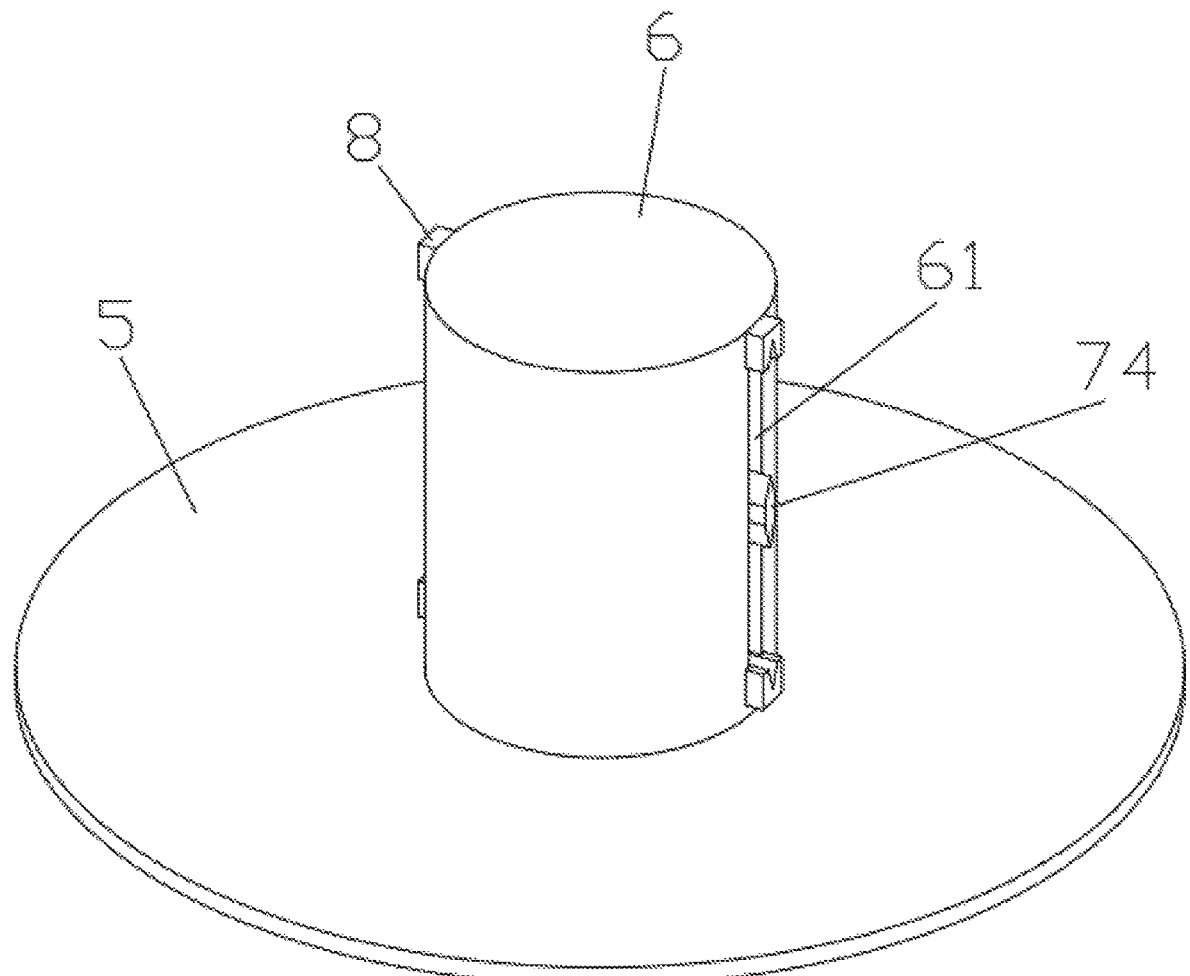
FIG. 2 is a three-dimensional view of a mounting shaft and a cutting wheel in Embodiment 1 of the present invention.
Figure 3:
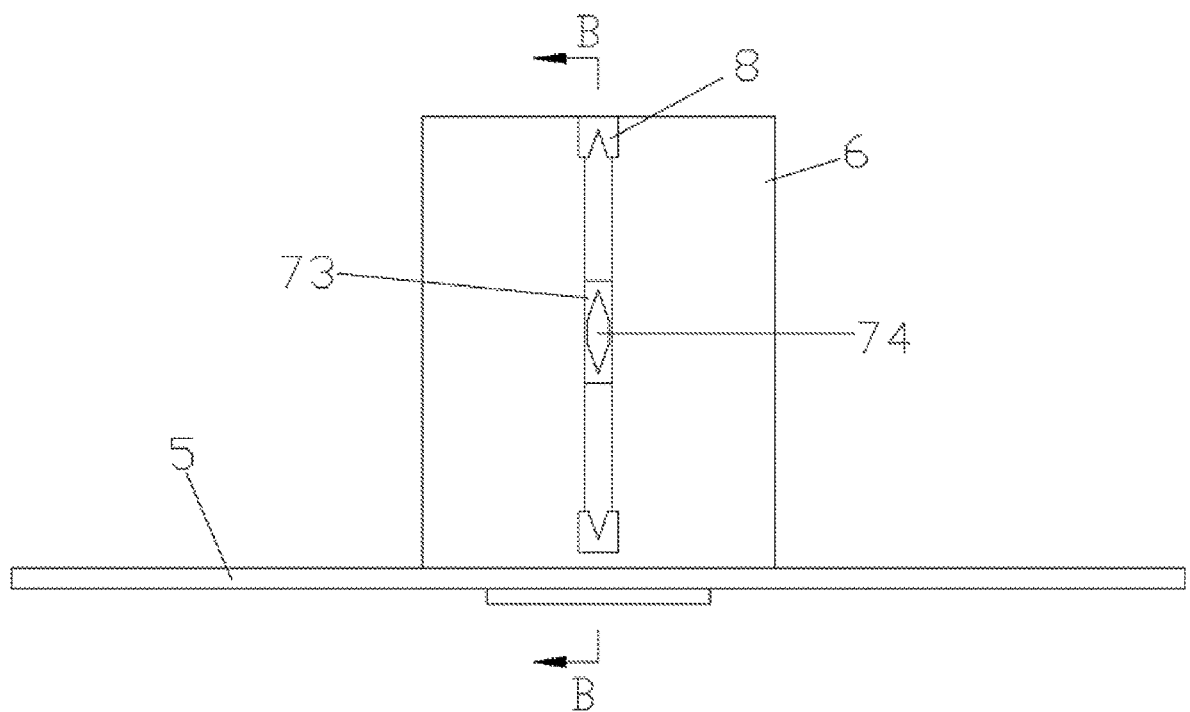
FIG. 3 is a side view of a mounting shaft and a cutting wheel in Embodiment 1 of the present invention.

Embodiment 1:

Referring to FIG. 1, a grass trimmer with an anti-sticking mechanism includes a first handle 1, a mounting rod 3, and a second handle 2, where the first handle 1 is arranged at a top end of the mounting rod 3, the second handle 2 is arranged at a position of the mounting rod 3 that is close to the first handle 1, a battery pack is arranged at a bottom end of the first handle 1, a machine head housing 4 is arranged at a bottom end of the mounting rod 3, a first motor is arranged inside the machine head housing 4, a mounting shaft 6 is arranged on an output shaft of the first motor via a coupling, and a cutting wheel 5 is arranged at a bottom end of the mounting shaft 6.

During use, a staff holds the first handle 1 with one hand and the second handle 2 with the other hand, and the two hands work together to lift up the mounting rod 3. The bottom end of the mounting rod 3 fixedly supports the machine head housing 4. The machine head housing 4 is configured to accommodate the first motor. In addition, the battery pack is connected to the first motor via a wire, the wire penetrates through the inside of the mounting rod 3, the battery pack provides electric energy to the first motor via the wire, the output shaft of the first motor rotates to drive rotation of the mounting shaft 6, the mounting shaft 6 drives the cutting wheel 5 to rotate, the cutting wheel 5 rotates circumferentially to cut off grass, to perform grass trimming, and the cutting wheel 5 is capable of treating grass at different heights by a 90° rotating wheel.

Referring to FIGS. 2-5, a cavity 62 is arranged inside the mounting shaft 6 along a length direction of the mounting shaft, a linear moving mechanism is arranged inside the cavity 62, blades 74 are arranged on two sides of the linear moving mechanism, strip-shaped through grooves 61 are arranged on two sides of the mounting shaft 6, the cavity 62 communicates with the two strip-shaped through grooves 61, outer ends of the blades 74 extend out of the strip-shaped through grooves 61, and the linear moving mechanism is capable of driving the blades 74 to move in the strip-shaped through grooves 61 along the length direction of the mounting shaft 6.

During use, when being started, the linear moving mechanism drives the two blades 74 to move in the two strip-shaped through grooves 61 along the length direction of the mounting shaft 6, respectively, and the outer ends of the blades 74 extend out of the strip-shaped through grooves 61, so that the outer ends of the blades cut off grass wound on the mounting shaft 6 during up-down movement of the blades 74, thereby preventing the mounting shaft 6 from being stuck by the grass, and improving the efficiency of mowing; and in addition, the linear moving mechanism is started when the mounting shaft 6 exactly starts to rotate, that is, circumferential rotation of the mounting shaft 6 and reciprocating movement of the blades 74 along the length direction of the mounting shaft 6 are carried out at the same time, so that the blades 74 can cut off, when there is the grass wound around the mounting shaft 6, the grass as early as possible, thereby avoiding the decrease of a rotational speed of the mounting shaft 6, causing the mounting shaft 6 to always rotate at a constant speed, and effectively improving the grass trimming efficiency.

Referring to FIGS. 4 and 6-8, the linear moving mechanism includes a first mounting plate 71, a threaded rod 72, a moving block 73, a second mounting plate 76, and a reversible motor 77, where the first mounting plate 71 is arranged at an inner top of the cavity 62, the second mounting plate 76 is located at an inner bottom of the cavity 62, the reversible motor 77 is mounted on a top surface of the second mounting plate 76, a bottom end of the threaded rod 72 is fixedly connected to an output shaft of the reversible motor 77, a top end of the threaded rod 72 is rotatably connected to a bottom surface of the first mounting plate 71, the moving block 73 is in threaded connection with the threaded rod 72, the moving block 73 is movably arranged inside the cavity 62, and inner ends of the two blades 74 are connected to an outer side of the moving block 73.

During use, the reversible motor 77 is started; when the output shaft of the reversible motor 77 rotates clockwise, the output shaft of the reversible motor 77 drives the threaded rod 72 to rotate clockwise, under the action of threaded connection between the threaded rod 72 and the moving block 73, the threaded rod 72 drives the moving block 73 to move up inside the cavity 62, and the moving block 73 drives the two blades 74 to move up at the same time, so that the two blades 74 simultaneously cut off the grass wound around the mounting shaft 6 upwards; and similarly, when the output shaft of the reversible motor 77 rotates counterclockwise, the moving block 73 moves down inside the cavity 62, so that the two blades 74 can simultaneously cut off the grass wound around the mounting shaft 6 downwards, that is, the up-down reciprocating movement of the blades 74 may cut off the grass wound around the mounting shaft 6, thereby cutting off the grass wound around the mounting shaft 6 timely and effectively, ensuring that the mounting shaft 6 can rotate stably at a constant speed, and improving the grass trimming efficiency of the cutting wheel 5.

Referring to FIGS. 2-5, the blades 74 are of a rectangular structure, upper and lower ends of each of the blades 74 are provided with cutting edges, stop blocks 8 are arranged at a top end and a bottom end of an outer wall of the mounting shaft 6, a stop groove 81 is arranged on one end of each of the two stop blocks 8 that is close to the corresponding blade 74, and a cross section of the stop groove 81 is of a V-shaped structure.

During use, when the blades 74 move up to a topmost end, top ends of the blades 74 extrude the interiors of the V-shaped stop grooves 81 of the stop blocks 8, so that grass at the topmost end is completely cut off under the extrusion of the blades 74 and the stop grooves 81; and when the blades 74 move down to a bottommost end, bottom ends of the blades 74 extrude the interiors of the V-shaped stop grooves 81 of the stop blocks 8, so that grass at the bottommost end is completely cut off under the extrusion of the blades 74 and the stop grooves 81. The design that the upper and lower ends of each of the blades 74 are provided with the cutting edges ensures that the blades 74 can cut off the grass wound around the mounting shaft 6 during up-down movement, thus effectively preventing the mounting shaft 6 from being stuck by the grass wound.

Figure 4:
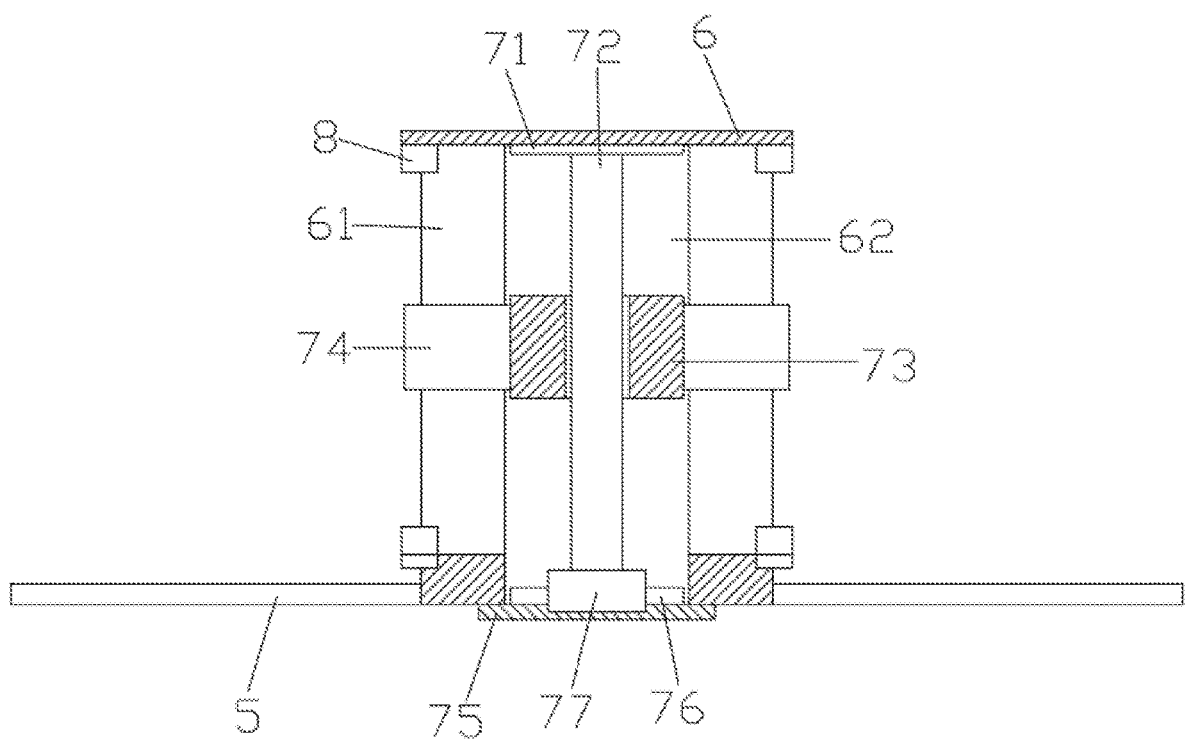
FIG. 4 is a sectional view of B-B in FIG. 3 according to Embodiment 1 of the present invention.
Figure 5:
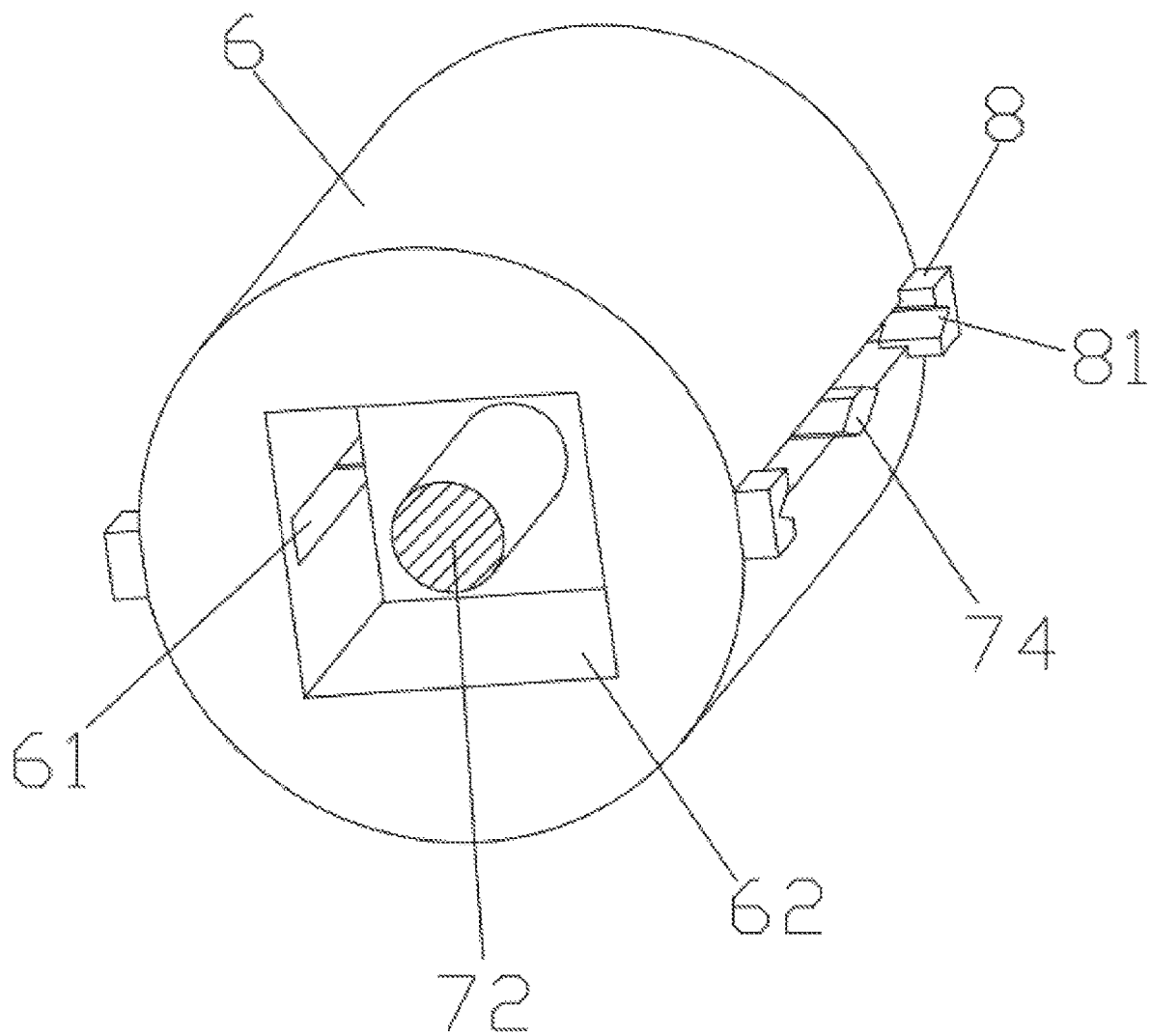
FIG. 5 is a three-dimensional view of a mounting shaft in Embodiment 1 of the present invention.

Referring to FIGS. 4 and 5, cross sections of the cavity 62, the first mounting plate 71, the second mounting plate 76, and the moving block 73 are of a square structure, a seal cover plate 75 is fixed to a bottom surface of the second mounting plate 76, and the seal cover plate 75 is fixedly connected to the bottom end of the mounting shaft 6 by a screw.

During use, the design that the cross sections of the cavity 62, the first mounting plate 71, the second mounting plate 76, and the moving block 73 are of the square structure ensures that side surfaces of the first mounting plate 71, the second mounting plate 76, and the moving block 73 are matched with an inner wall of the cavity 62, so that the inner wall of the cavity 62 can limit and clamp the first mounting plate 71, the second mounting plate 76, and the moving block 73, thereby avoiding the rotation of the first mounting plate 71, the second mounting plate 76, and the moving block 73 inside the cavity 62, and ensuring stable mounting of the first mounting plate 71 and the second mounting plate 76 as well as stable movement of the moving block 73. In addition, the seal cover plate 75 is configured to support the second mounting plate 76. When the linear moving mechanism needs to be repaired, the screw is removed, the seal cover plate 75 is moved, and the seal cover plate 75 drives the first mounting plate 71, the second mounting plate 76, and the moving block 73 to move out of the cavity 62, to facilitate the repair of the linear moving mechanism.

Figure 6:
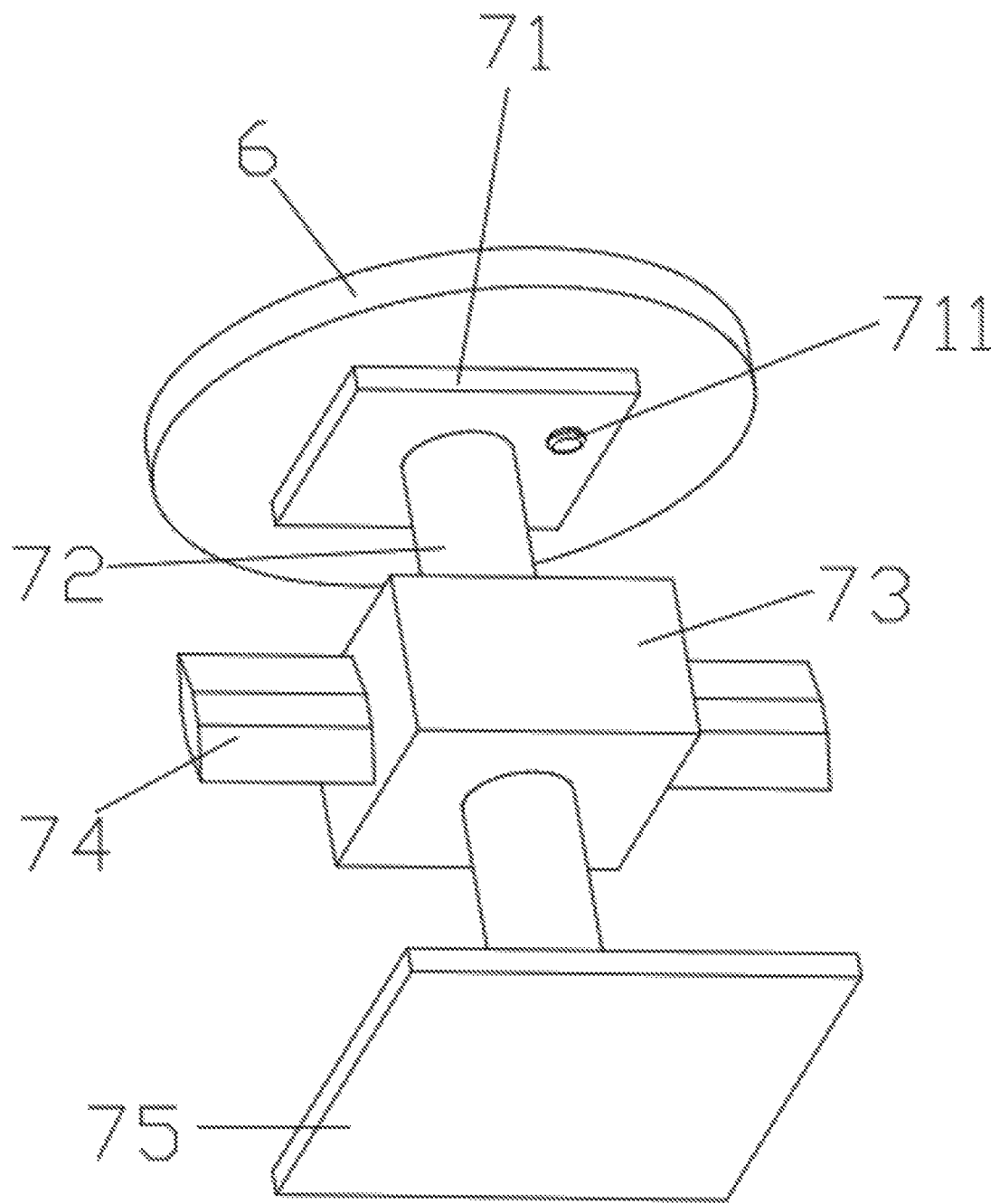
FIG. 6 is a three-dimensional view of a linear moving mechanism in Embodiment 1 of the present invention.
Figure 7:
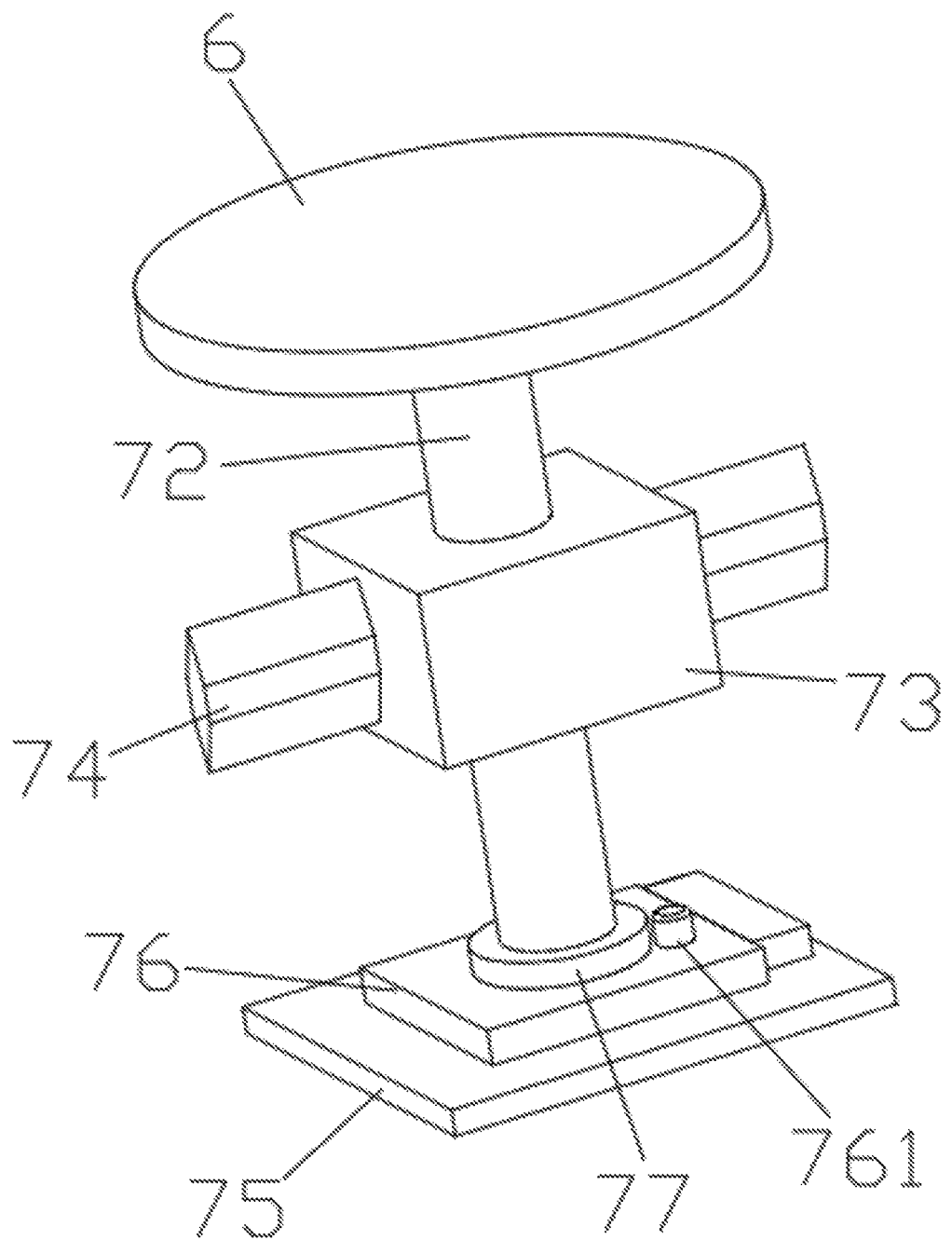
FIG. 7 is a three-dimensional view (another angle of view) of a linear moving mechanism in Embodiment 1 of the present invention.
Figure 8:
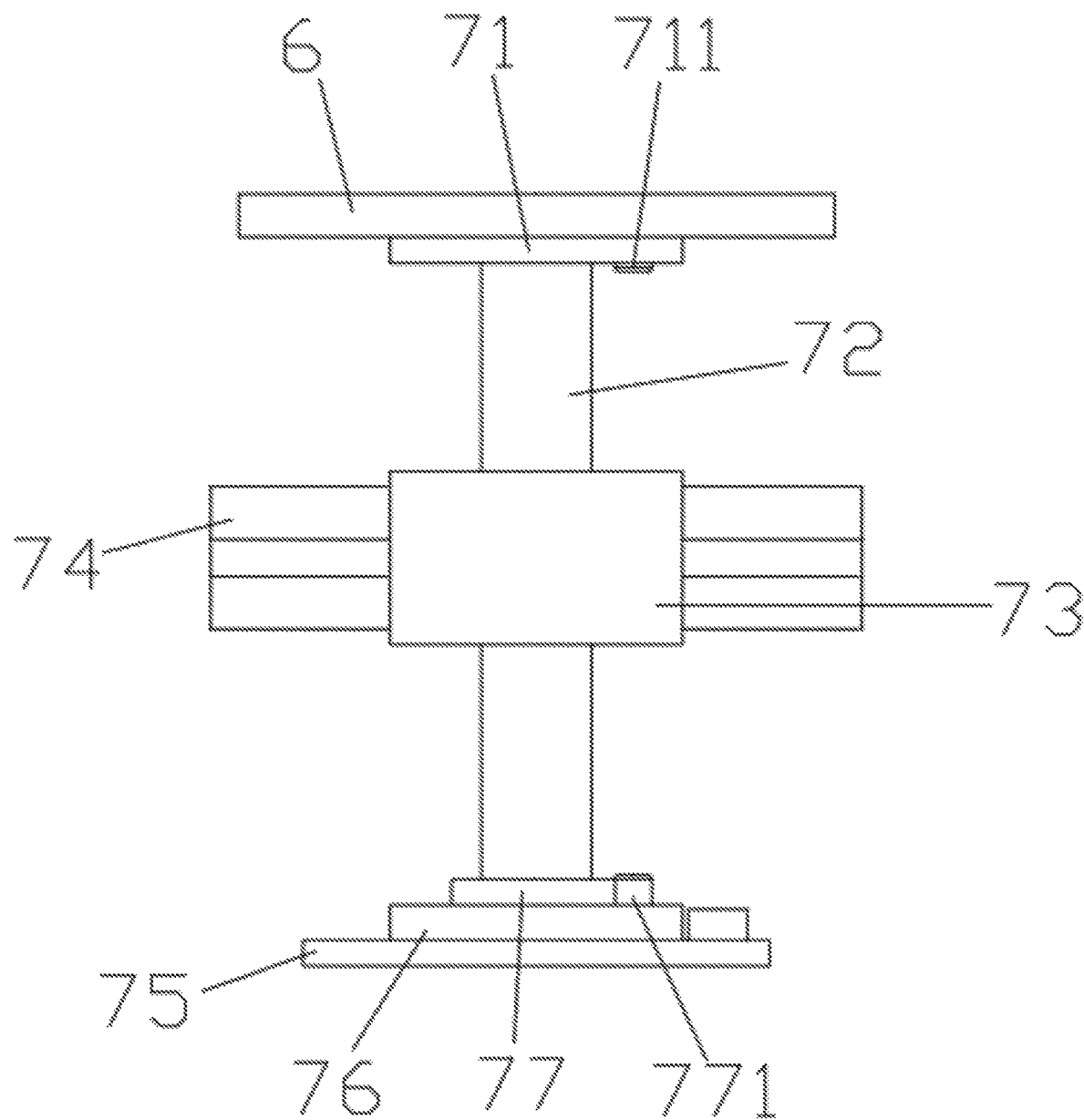
FIG. 8 is a front view of a linear moving mechanism in Embodiment 1 of the present invention.

Referring to FIGS. 6-8, a first touch switch 711 is mounted on the bottom surface of the first mounting plate 71, and a second touch switch 771 is arranged on the top surface of the second mounting plate 76.

When the top ends of the blades 74 extrude the stop grooves 81, the top surface of the moving block 73 exactly extrudes the first touch switch 711. At this time, the output shaft of the reversible motor 77 switches to counterclockwise rotation, so that the blades 74 move down. When the bottom ends of the blades 74 extrude the stop grooves 81, the bottom surface of the moving block 73 exactly extrudes the second touch switch 771. At this time, the output shaft of the reversible motor 77 switches to clockwise rotation, so that the blades 74 move up. That is, through the cooperation of the first touch switch 711 and the second touch switch 771, the blades 74 can move up and down, and the up-down reciprocating movement of the blades 74 is implemented, so that the grass exactly wound around the mounting shaft 6 is cut off in time, thereby effectively avoiding the decrease of the rotational speed of the mounting shaft 6.

Referring to FIGS. 6-8, a storage battery is arranged on a top surface of the seal cover plate 75, and the storage battery is electrically connected to the reversible motor 77, the first touch switch 711, and the second touch switch 771 via wires.

During use, the storage battery provides electric energy to the reversible motor 77, the first touch switch 711, and the second touch switch 771. The staff may also replace the storage battery by removing the seal cover plate 75, to ensure continuous use of the storage battery. The cooperation of the reversible motor 77, the first touch switch 711, and the second touch switch 771 can implement the up-down reciprocating movement of the blades 74.

Figure 9:
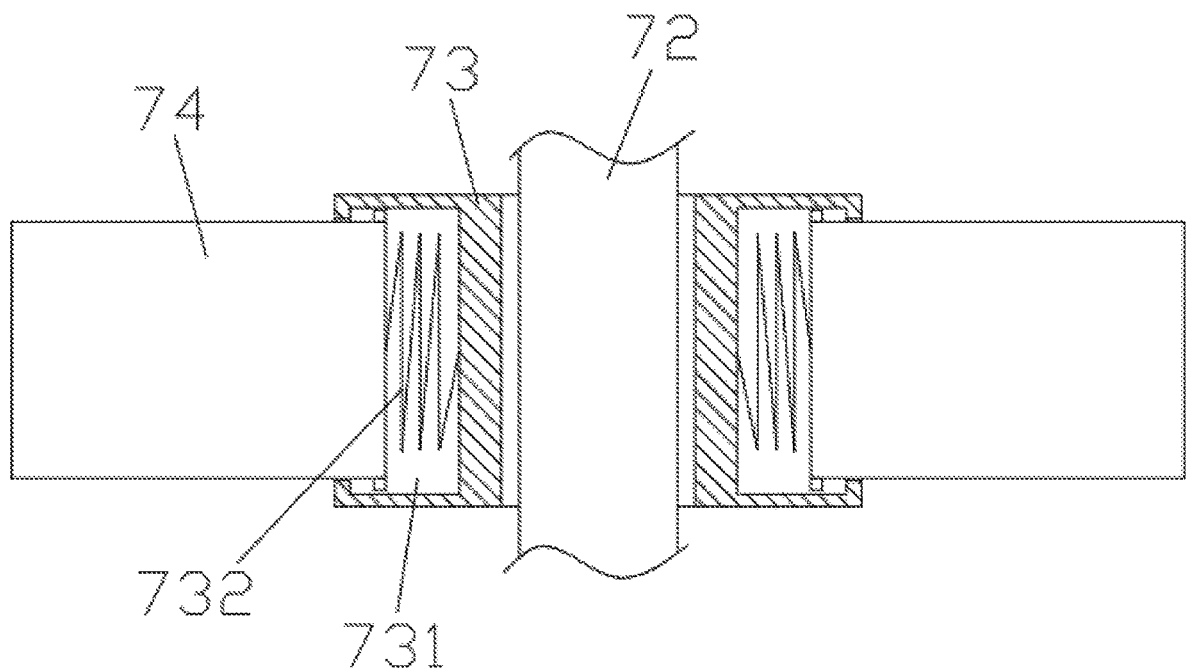
FIG. 9 is a sectional view of blades and a moving block in Embodiment 2 of the present invention.

Embodiment 2:

Referring to FIG. 9, a rectangular cavity 731 is arranged inside the moving block 73, the inner ends of the blades 74 extend into the rectangular cavity 731, a return spring 732 is arranged between the inner ends of the blades 74 and an inner wall of the rectangular cavity 731, limit clamp blocks are fixed to the inner ends of the blades 74, and the limit clamp blocks are configured to limit the inner ends of the blades 74 to the inside of the rectangular cavity 731.

During use, when the rotational speed of the mounting shaft 6 increases, a centrifugal force on the blades 74 increases with the rotational speed of the mounting shaft 6, so that the return spring 732 is stretched outwards by the blades 74, and a length of the outer ends of the blades 74 extending out of the mounting shaft 6 increases. When the rotational speed of the mounting shaft 6 increases, a thickness of the grass wound around the mounting shaft 6 also increases, and extending out the outer ends of the blades 74 by a greater length may improve the effect of grass cutting, to adapt to the increase of the rotational speed of the mounting shaft 6. When the rotational speed of the mounting shaft 6 is lower, the centrifugal force on the blades 74 decreases, and the blades 74 move inwards under the action of an elastic force of the return spring 732, so that the length of the outer ends of the blades 74 extending out of the mounting shaft 6 decreases, and the outer ends of the blades 74 may be properly protected.

In addition, the present invention provides a use method of a grass trimmer with an anti-sticking mechanism, including the following steps:

S1: starting a first motor, so that an output shaft of the first motor drives a mounting shaft 6 to rotate, and the mounting shaft 6 drives a cutting wheel 5 to rotate for mowing;

S2: starting a reversible motor 77, so that an output shaft of the reversible motor 77 drives a threaded rod 72 to rotate, where when the threaded rod 72 rotates clockwise, the threaded rod 72 drives a moving block 73 to move up, and the moving block 73 drives blades 74 to cut off grass wound around the mounting shaft 6 upwards; and when the threaded rod 72 rotates counterclockwise, the threaded rod 72 drives the moving block 73 to move down, and the moving block 73 drives the blades 74 to cut off the grass wound around the mounting shaft 6 downwards; and S3: when the moving block 73 extrudes a second touch switch 771, switching the reversible motor 77 to clockwise rotation, and when the moving block 73 extrudes a first touch switch 711, switching the reversible motor 77 to counterclockwise rotation.

The above are only the embodiments of the present application and are not intended to limit the present application. For those skilled in the art, the present application may have various modifications and changes. Any modifications, equivalent substitutions, improvements and the like made within the spirit and principle of the present application should be included within the scope of the claims of the present application.

What is claimed is:

1. A grass trimmer with an anti-sticking mechanism, comprising a first handle (1), a mounting rod (3), and a second handle (2), wherein the first handle (1) is arranged at a top end of the mounting rod (3), the second handle (2) is arranged at a position of the mounting rod (3) that is close to the first handle (1), a battery pack is arranged at a bottom end of the first handle (1), wherein a machine head housing (4) is arranged at a bottom end of the mounting rod (3), a first motor is arranged inside the machine head housing (4), a mounting shaft (6) is arranged on an output shaft of the first motor via a coupling, a cutting wheel (5) is arranged at a bottom end of the mounting shaft (6), and a 90° rotating wheel is mounted between the cutting wheel (5) and the mounting shaft (6); and a cavity (62) is arranged inside the mounting shaft (6) along a length direction of the mounting shaft, a linear moving mechanism is arranged inside the cavity (62), blades (74) are arranged on two sides of the linear moving mechanism, strip-shaped through grooves (61) are arranged on two sides of the mounting shaft (6), outer ends of the blades (74) extend out of the strip-shaped through grooves (61), and the linear moving mechanism is capable of driving the blades (74) to move in the strip-shaped through grooves (61) along the length direction of the mounting shaft (6).

2. The grass trimmer with an anti-sticking mechanism according to claim 1, wherein the linear moving mechanism comprises a first mounting plate (71), a threaded rod (72), a moving block (73), a second mounting plate (76), and a reversible motor (77), the first mounting plate (71) is arranged at an inner top of the cavity (62), the second mounting plate (76) is located at an inner bottom of the cavity (62), the reversible motor (77) is mounted on a top surface of the second mounting plate (76), a bottom end of the threaded rod (72) is fixedly connected to an output shaft of the reversible motor (77), a top end of the threaded rod (72) is rotatably connected to a bottom surface of the first mounting plate (71), the moving block (73) is in threaded connection with the threaded rod (72), the moving block (73) is movably arranged inside the cavity (62), and inner ends of the two blades (74) are connected to an outer side of the moving block (73).

3. The grass trimmer with an anti-sticking mechanism according to claim 1, wherein the blades (74) are of a rectangular structure, upper and lower ends of each of the blades (74) are provided with cutting edges, stop blocks (8) are arranged at a top end and a bottom end of an outer wall of the mounting shaft (6), a stop groove (81) is arranged on one end of each of the two stop blocks (8) that is close to the corresponding blade (74), and a cross section of the stop groove (81) is of a V-shaped structure.

4. The grass trimmer with an anti-sticking mechanism according to claim 2, wherein cross sections of the cavity (62), the first mounting plate (71), the second mounting plate (76), and the moving block (73) are of a square structure, a seal cover plate (75) is fixed to a bottom surface of the second mounting plate (76), and the seal cover plate (75) is fixedly connected to the bottom end of the mounting shaft (6) by a screw.

5. The grass trimmer with an anti-sticking mechanism according to claim 2, wherein a first touch switch (711) is mounted on the bottom surface of the first mounting plate (71), and a second touch switch (771) is arranged on the top surface of the second mounting plate (76).

6. The grass trimmer with an anti-sticking mechanism according to claim 5, wherein when top ends of the blades (74) extrude stop grooves (81), a top surface of the moving block (73) exactly extrudes the first touch switch (711), and when bottom ends of the blades (74) extrude the stop grooves (81), a bottom surface of the moving block (73) exactly extrudes the second touch switch (771).

7. The grass trimmer with an anti-sticking mechanism according to claim 4, wherein a storage battery is arranged on a top surface of the seal cover plate (75), and the storage battery is electrically connected to the reversible motor (77), a first touch switch (711), and a second touch switch (771) via wires.

8. The grass trimmer with an anti-sticking mechanism according to claim 2, wherein a rectangular cavity (731) is arranged inside the moving block (73), the inner ends of the blades (74) extend into the rectangular cavity (731), a return spring (732) is arranged between the inner ends of the blades (74) and an inner wall of the rectangular cavity (731), limit clamp blocks are fixed to the inner ends of the blades (74), and the limit clamp blocks are configured to limit the inner ends of the blades (74) to the inside of the rectangular cavity (731).

9. A method for using a grass trimmer with an anti-sticking mechanism comprising steps of:
   S1: starting a first motor, so that an output shaft of the first motor drives a mounting shaft (6) to rotate, and the mounting shaft (6) drives a cutting wheel (5) to rotate for mowing;
   S2: starting a reversible motor (77), so that an output shaft of the reversible motor (77) drives a threaded rod (72) to rotate, wherein when the threaded rod (72) rotates clockwise, the threaded rod (72) drives a moving block (73) to move up, and the moving block (73) drives blades (74) to cut off grass wound around the mounting shaft (6) upwards; and when the threaded rod (72) rotates counterclockwise, the threaded rod (72) drives the moving block (73) to move down, and the moving block (73) drives the blades (74) to cut off the grass wound around the mounting shaft (6) downwards; and
   S3: when the moving block (73) extrudes a second touch switch (771), switching the reversible motor (77) to clockwise rotation, and when the moving block (73) extrudes a first touch switch (711), switching the reversible motor (77) to counterclockwise rotation.

\* \* \* \* \*